US008859935B2

(12) United States Patent
Dunshee

(10) Patent No.: US 8,859,935 B2
(45) Date of Patent: Oct. 14, 2014

(54) METHOD OF PREPARING MATERIAL FOR WELDING

(75) Inventor: Patrick Dunshee, Earlville, NY (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 13/477,507

(22) Filed: May 22, 2012

(65) Prior Publication Data

US 2013/0313230 A1 Nov. 28, 2013

(51) Int. Cl.

| | |
|---|---|
| ***B23K 26/00*** | (2014.01) |
| ***B23K 26/08*** | (2014.01) |
| ***B23K 26/10*** | (2006.01) |
| ***B08B 3/12*** | (2006.01) |
| ***B08B 6/00*** | (2006.01) |
| ***B08B 7/00*** | (2006.01) |
| ***B08B 7/02*** | (2006.01) |

(52) U.S. Cl.
USPC ..................... 219/121.69; 219/121.8; 219/75; 134/1

(58) Field of Classification Search
CPC .................................................... B08B 7/0042
USPC ......................... 219/75, 121.69, 121.8; 134/1
See application file for complete search history.

(56) References Cited

U.S. PATENT DOCUMENTS 4,401,877 A 8/1983 Webber et al.
4,998,341 A * 3/1991 Jones ............................. 29/828
5,499,668 A 3/1996 Katayama et al.
6,553,647 B1 * 4/2003 Itoh et al. ................... 29/603.06
8,285,379 B2 * 10/2012 Iyer et al. ........................ 607/36
2003/0006219 A1 * 1/2003 Miller ...................... 219/121.68
2005/0155640 A1 * 7/2005 Schuh ........................... 136/224
2005/0155958 A1 * 7/2005 Arai et al. ................ 219/121.72
2007/0017908 A1 * 1/2007 Sercel et al. ............. 219/121.73
2007/0289957 A1 * 12/2007 Eiterer et al. ............ 219/121.78
2008/0029152 A1 * 2/2008 Milshtein et al. ............. 136/252
2008/0072924 A1 3/2008 Nakamae et al.
2011/0037176 A1 * 2/2011 Straub ........................... 257/773
2011/0278269 A1 * 11/2011 Gold et al. ............... 219/121.69
2011/0290276 A1 12/2011 Cha et al.
2012/0000893 A1 * 1/2012 Broude et al. ........... 219/121.69
2012/0236899 A1 * 9/2012 Subramanian et al. ........... 374/1

FOREIGN PATENT DOCUMENTS

| | | |
|---|---|---|
| GB | 2169496 | 7/1986 |
| JP | 2003200122 | 7/2003 |
| WO | 8807431 | 10/1988 |

OTHER PUBLICATIONS

EP Search Report dated Sep. 18, 2013 for corresponding EP Application No. 13168625.5.

* cited by examiner

*Primary Examiner* — Tu B Hoang
*Assistant Examiner* — Michael Hoang
(74) *Attorney, Agent, or Firm* — General Electric Company; James E. Cole

(57) ABSTRACT

The present disclosure relates to methods of preparing a material for welding. The material is prepared by utilizing a laser to obliterate contaminants from the material surface.

16 Claims, 7 Drawing Sheets

METHOD OF PREPARING MATERIAL FOR WELDING

BACKGROUND

Present embodiments relate generally to gas turbine engines. More particularly, but not by way of limitation, present embodiments relate to methods of preparing a material with a laser for welding.

In turbine engines, air is pressurized in a compressor and mixed with fuel in a combustor for generating hot combustion gas which flow downstream through turbine stages. These turbine stages extract energy from the combustion gas. A high pressure turbine includes a first stage nozzle and a rotor assembly including a disk and a plurality of turbine blades. The high pressure turbine first receives the hot combustion gas from the combustor and includes a first stage stator nozzle that directs the combustion gas downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor disks are joined to the compressor by a corresponding rotor shaft for powering the compressor during operation. These are typically referred to as the high pressure turbine. The turbine engine may include a number of stages of static airfoils, commonly referred to as vanes, interspaced in the engine axial direction between rotating airfoils commonly referred to as blades. A multi-stage low pressure turbine follows the two stage high pressure turbine and is typically joined by a second shaft to a fan disposed upstream from the compressor in a typical turbofan aircraft engine configuration for powering an aircraft in flight.

As the combustion gas flows downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

During the operation of the gas turbine engine, it is necessary to obtain temperature readings at different locations in the engine. This data is utilized by the engine control logic to properly operate the engine and provide maximum performance at the highest efficiency. One such temperature probe which is utilized at the exhaust area of the combustor, it is known as an Exhaust Gas Temperature probe or EGT probe. These probes utilize thermocouples, typically having a dissimilar metal to create a differential which may be then related to a temperature which is provided to the engine control logic. The thermocouple wires are disposed in a sheath with an insulating magnesium oxide. To prepare the thermocouple wires for installation and welding, the thermocouple sheath is stripped away from the portion of the thermocouple wire or lead which is to be welded. The magnesium oxide powder must also be cleaned away.

Various methods have been attempted in order to perform this cleaning. The magnesium oxide powder has been cleaned with alcohol in an attempt to remove such from the wire. Additionally, rotating blades have been utilized in an attempt to mechanically remove the magnesium oxide. As a further alternative, abrasive pads have been utilized in an attempt to manually remove the magnesium oxide powder. Unfortunately, the thermocouple leads are extremely costly and mechanical and other means of cleaning have resulted in damage and discarding of an unacceptable percentage of the thermocouples.

Of the remaining thermocouples which are not damaged in the mechanical cleaning process, various of these structures have problems with the weld bond due to remaining contaminants on the surface of the thermocouple lead or wire. Specifically, for example, magnesium oxide powder may not be thoroughly cleaned from the surface and therefore results in welds which have high porosity in the weld, low percentage of weld fusion across the wire diameter and low percentage of weld fusion. The fractures of a poor weld bond are depicted in FIG. 8 across the terminal.

As may be seen from the foregoing, there is a need to optimize the cleaning procedure of materials which will be welded while limiting damage during the process so that the optimal bond may occur when the weld process occurs.

SUMMARY

Some embodiments of the present disclosure relate to a method of preparing a material for welding. The material is prepared by utilizing a laser to obliterate contaminants from the material surface. The laser provides an improved cleaning as opposed to other methods of cleaning. The method also inhibits damage to the wires or leads which occurs with mechanical cleaning processes.

According to some embodiments, a method of preparing a thermocouple for welding, comprises exposing a lead, positioning the lead adjacent a laser, passing the laser over the lead at least once and obliterating surface contaminants from the lead with the laser.

All of the above outlined features are to be understood as exemplary only and many more features and objectives of the method may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this disclosure, and the manner of attaining them, will become more apparent and the process sensor will be better understood by reference to the following description of embodiments taken in conjunction with the accompanying drawings, wherein.

DETAILED DESCRIPTION

Figure 1:
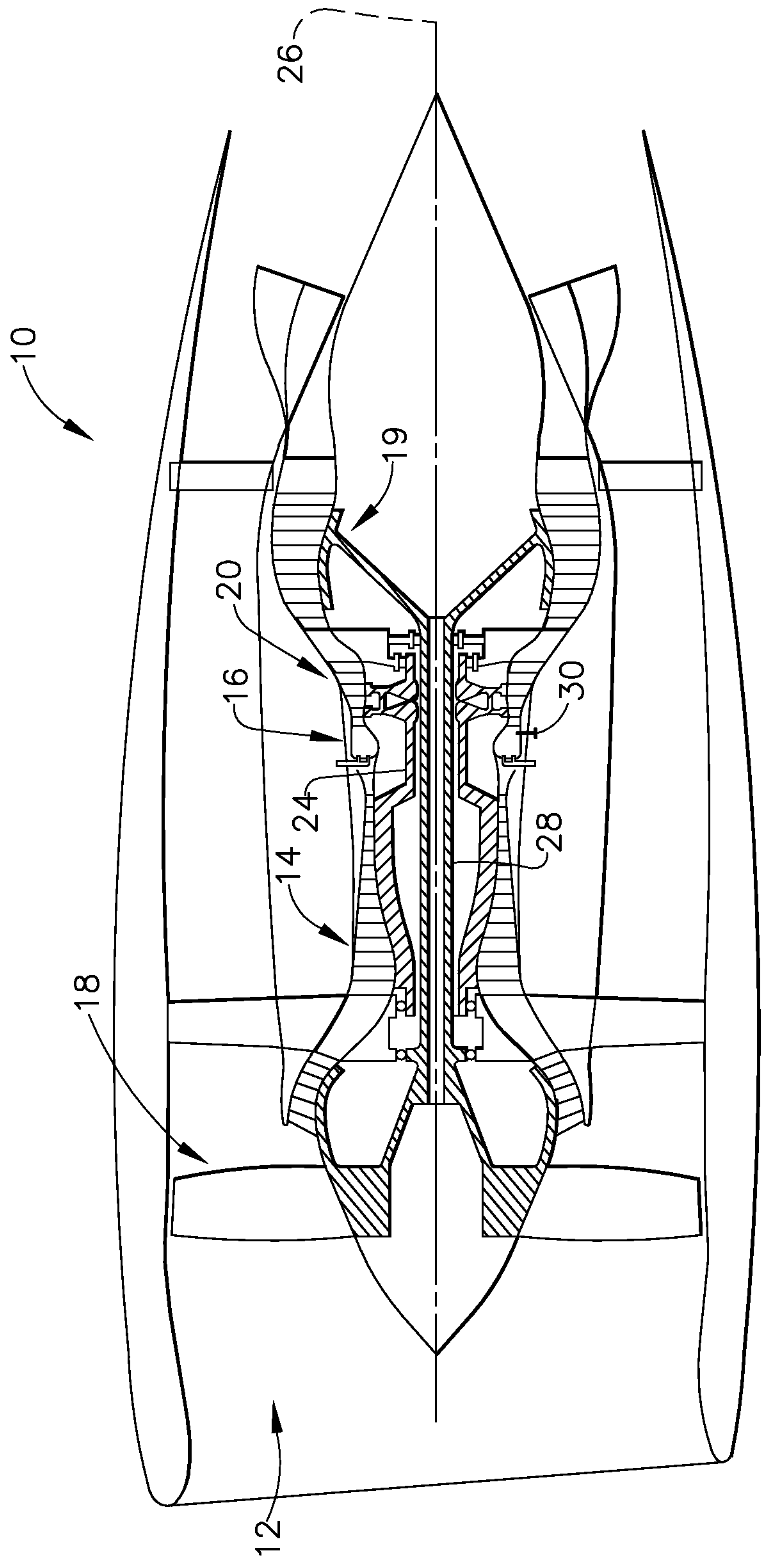
FIG. 1 is a side section schematic view of an exemplary turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Present embodiments provide a method of laser prepping a thermocouple wire or lead prior to welding. The prepping process provides laser removal of contaminants on the material, such as a wire surface, which would otherwise preclude an appropriate weld. Additionally, the laser prepping method results in less damage to the thermocouple wires or leads.

The terms fore and aft are used with respect to the engine axis and generally mean toward the front of the turbine engine or the rear of the turbine engine in the direction of the engine axis, respectively.

Referring now to FIGS. 1-7, various embodiments of methods of cleaning or prepping a thermocouple lead which provides improved welding characteristics.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. Depending on the usage, the engine inlet end 12 may alternatively contain multi-stage compressors rather than a fan. The gas turbine 10 is axis-symmetrical about engine axis 26 or shaft 24 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design.

The axis-symmetrical shaft 24 extends through the through the turbine engine 10, from the forward end to an aft end. The shaft 24 is supported by bearings along its length. The shaft 24 may be hollow to allow rotation of a low pressure turbine shaft 28 therein. Both shafts 24, 28 may rotate about a centerline 26 of the engine. During operation the shafts 24, 28 rotate along with other structures connected to the shafts such as the rotor assemblies of the turbine 20 and compressor 14 in order to create power or thrust depending on the area of use, for example power, industrial or aviation.

Referring still to FIG. 1, the inlet 12 includes a turbofan 18 which has a plurality of blades. The turbofan 18 is connected by shaft 28 to the low pressure turbine 19 and creates thrust for the turbine engine 10. Aft of the combustor 16 is one exemplary location for a temperature probe 30. Although an exhaust gas temperature is discussed herein, sensors may be initialized at various locations such as the compressor 14 turbines 20, 19 and other locations. Additionally, the method of preparing is not limited to temperature sensors but may be utilized with any type of sensor requiring leads to be cleaned prior to an subsequent manufacturing process.

Figure 2:
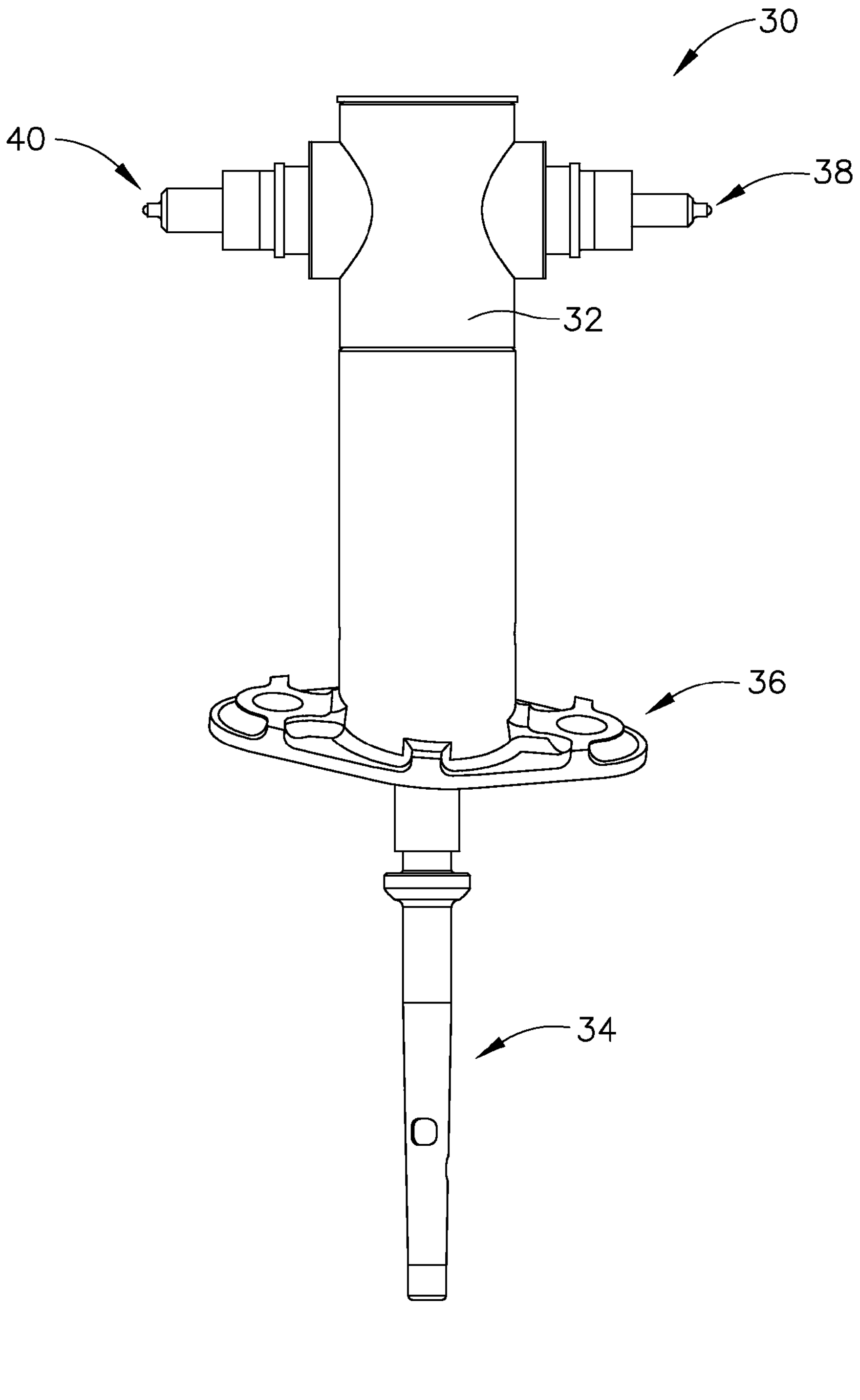
FIG. 2 is an side elevation view of an exemplary process sensor assembly.

Referring now to FIG. 2, a temperature probe 30 which is defined by elongate housing 32 having a probe portion 34 extending from the lower end thereof. Along some portion of the housing 32 is a flange 36 which is utilized to mount the probe 30 in a location of the gas turbine engine 10.

The upper portion of the housing includes two terminals 38, 40 extending from opposite sides thereof. The terminals of the exemplary embodiment are "KN" and "KP" type leads or wires. One skilled in the art will understand that KN and KP are negatively polarized nickel-aluminum-silicon type K thermoelement and positively polarized nickel-chromium type K thermoelement, respectively. The terminals 38, 40 are each formed by two wires or leads which extend outwardly from the housing structure and which are welded together. Each pair of wires must be cleaned at ends in order to provide a proper weld and form terminals.

Figure 3:
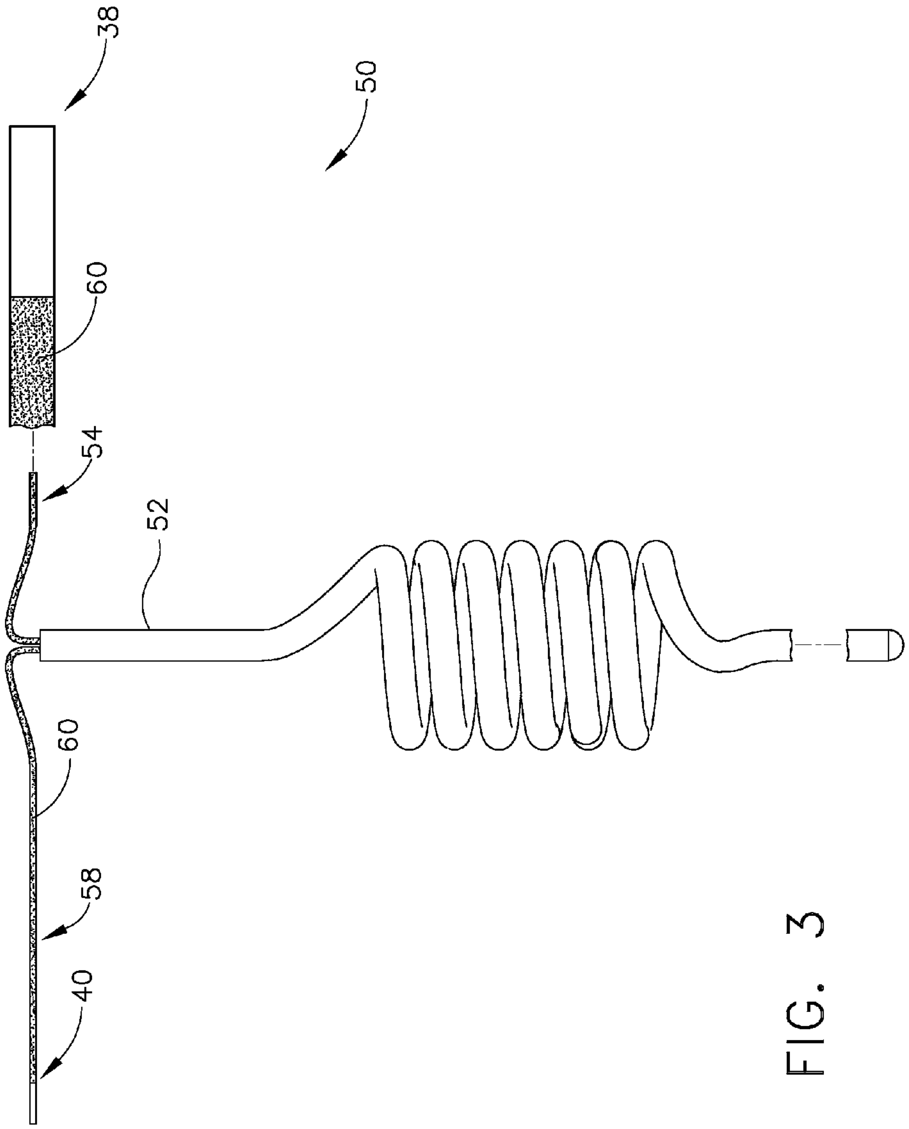
FIG. 3 is a side elevation view of a thermocouple.

Referring now to FIG. 3, an elevation view of an exemplary thermocouple 50 is depicted. The thermocouple 50 includes a sheath 52 which according to one exemplary embodiment may be formed of an inconel material. However, various materials may be utilized to form this sheath. Within the sheath 52 are the thermocouple leads 54, 58, which are each formed of a pair of wires and which are welded together at ends to define the terminals 38, 40. The sheath 52 is also filled with an insulation 60, for example magnesium oxide, in powder form to insulate leads 54, 58. The magnesium oxide 60 is depicted in the figure with stippling along the leads 54, 58. The magnesium oxide 60 must be removed near the end of the leads 54, 58 so that the pairs of wires may be welded together to define the terminals 38, 40.

Figure 8:
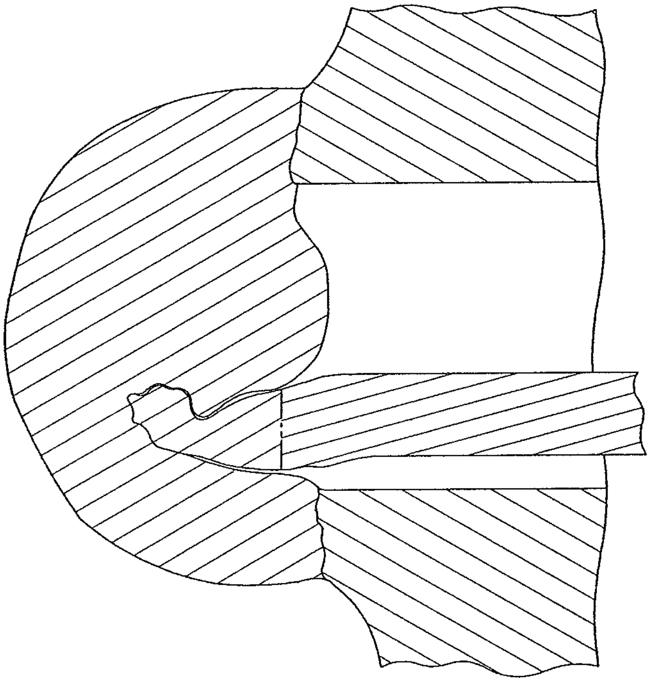
FIG. 8 (PRIOR ART)
FIG. 8 is an section view of an exemplary weld depicting poor bond due to inadequate cleaning.

The problem as described previously with thermocouple leads occur when cleaning the ends of the leads 54, 58 to form suitable areas for welding to form the terminal 38, 40. The magnesium oxide removal process can be difficult and lead to damaged leads or weak bonds due to the contaminant material not being thoroughly removed from the leads 54, 58. This poor weld bond is shown at FIG. 8 which fractures extending through the welded material.

Figure 4:
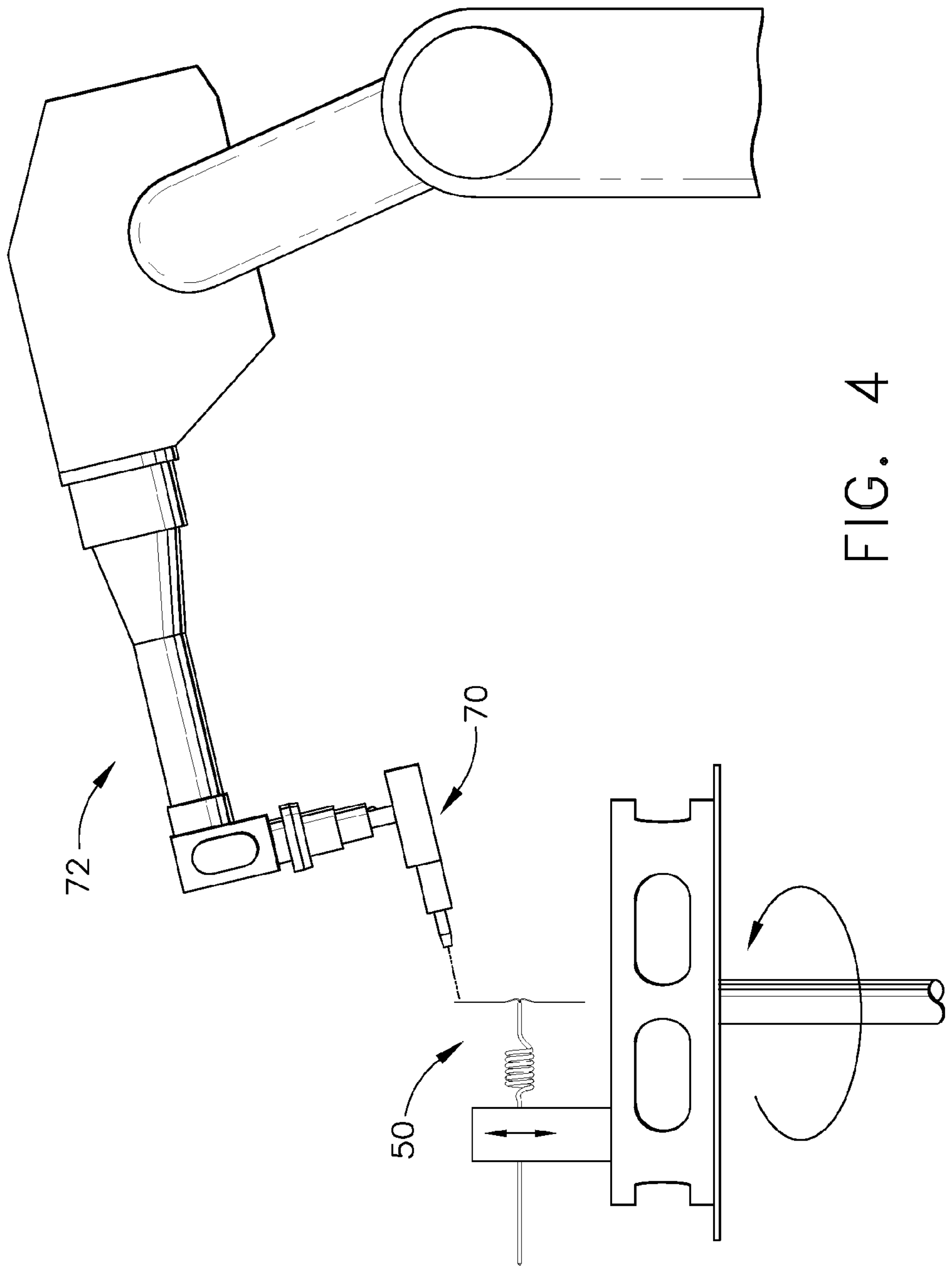
FIG. 4 is a schematic view of a method of preparing the leads of a thermocouple with a laser.

Referring now to FIG. 4, an exemplary schematic view of the laser which prepares the thermocouple 50, is depicted schematically. The laser 70 may be utilized to prepare the leads 54, 58 by obliterating contaminants 60 at the ends of the wire pairs that define the terminals 38, 40 (FIG. 3). The laser 70 is depicted with a plurality of linkages 72 so that the laser 70 may be movable relative to the thermocouple 50. Any means of movement may be utilized and the depiction of linkages should not be considered limiting. For example, linear motion may be used. Similarly, the laser may be rotatable. Additionally, the thermocouple 50 may be movable which allows for movement of the thermocouple 50 relative to the laser 70. Thus either or both of the structures may be movable to aid in the cleaning procedure. According to at least one exemplary embodiment, the laser 70 may pass the thermocouple leads 54, 58 in one pass. Next the leads are rotated 180° so that the opposite side of the leads may also be cleaned as desirable. This method may be used due to the circular cross-section of the wires defining leads 54, 58.

The exemplary method exposes the leads 54, 58 for subsequent welding. First, the leads 54, 58 are positioned adjacent the laser 70 as depicted in one exemplary embodiment of FIG. 4. Next the laser 70 passes over the leads 54, 58, each of which are defined by a pair of wires. This may require movement of one or more of the wires, laser or retaining structures. With the laser 70 operating, the surface contaminants are obliterated from the ends of leads 54, 58 to expose clean wire or lead material. This renders the leads 54, 58 suitable for welding.

When moving the laser 70, the speed of the movement varies the energy which is imparted to the thermocouple leads 54, 58. For example, when the laser is moved faster relative to the leads 54, 58 the energy imparted decreases. To the contrary when the laser 70 is moved slower, the energy imparted on the leads 54, 58 increases. According to some exemplary embodiments, the laser 70 may move at a velocity of about 30 inches per second according to one preferable but exemplary embodiment. Other velocities may utilize to impart a desired amount of energy for obliteration of contaminants 60.

The laser 70 may have a pulse frequency of between 100,000 and 150,000 cycles per second (Hz). More preferably, the laser 70 may have a pulse frequency ranging between 30,000 and 60,000 cycles per second. The laser 70 may have a beam width or tracking width of between 0.001 inches and 0.005 inches. More preferably, the laser 70 may have a beam width or track width of about 0.002 inches.

Figure 5:
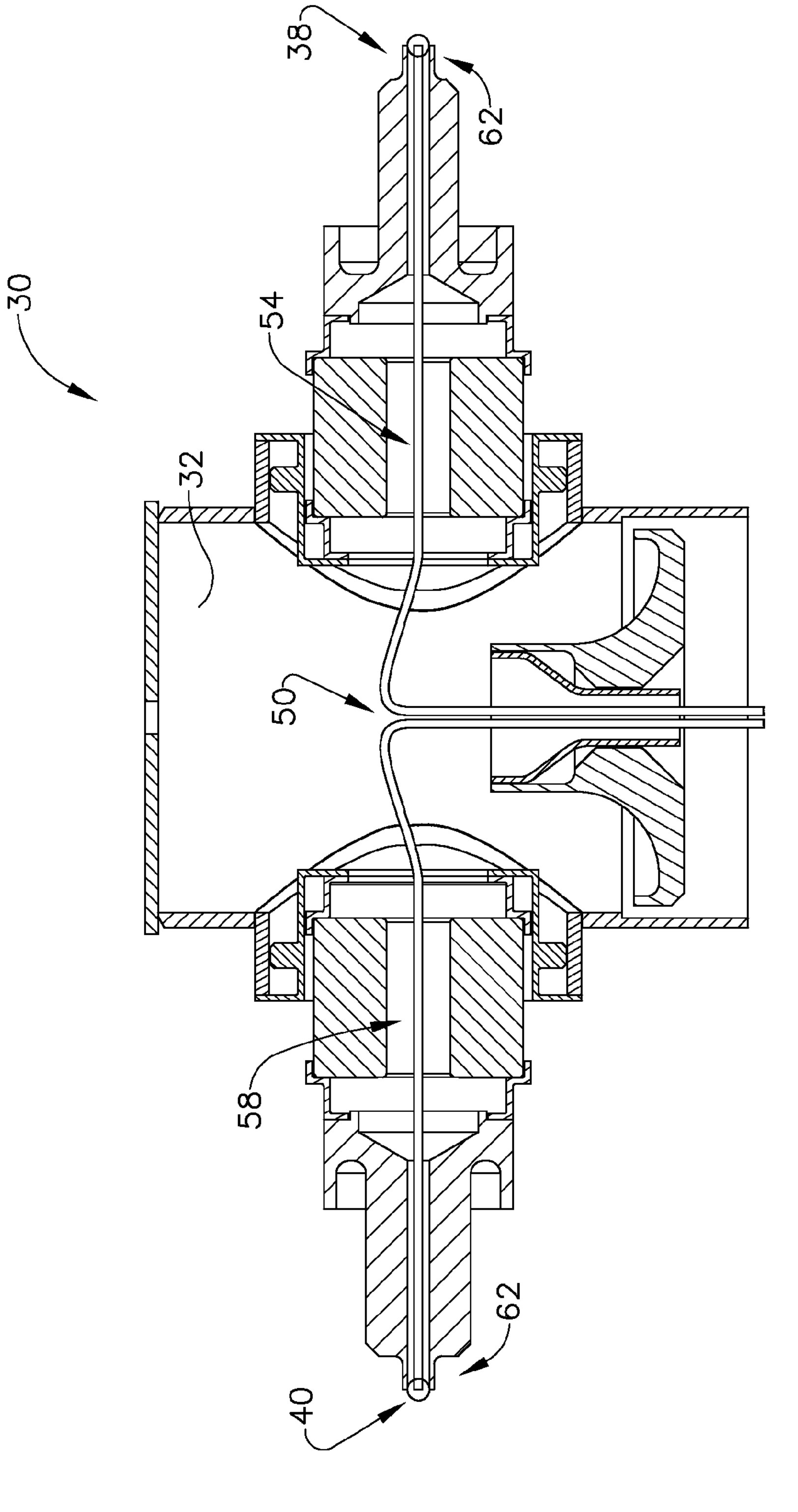
FIG. 5 is a detail section view of the process sensor assembly.

Referring now to FIG. 5, a side section view of the exemplary probe 30 is depicted in part with the housing 32 shown and terminals 38, 40 extending therefrom. The thermocouple 50 is shown with the leads 54, 58 extending from opposite sides of a housing 32 and forming the terminal 38, 40. Each of the terminals 38, 40, as previously described, is formed of a pair of wires which are welded together. Although a single wire is shown, a pair of wires is utilized and the unseen wire is disposed behind the wire that is depicted. This manufacturing step occurs after the cleaning or preparation process of the leads 54, 58 and with the wires extending from terminal walls 62, the wire pairs are welded to define the terminal 38, 40.

Figure 6:
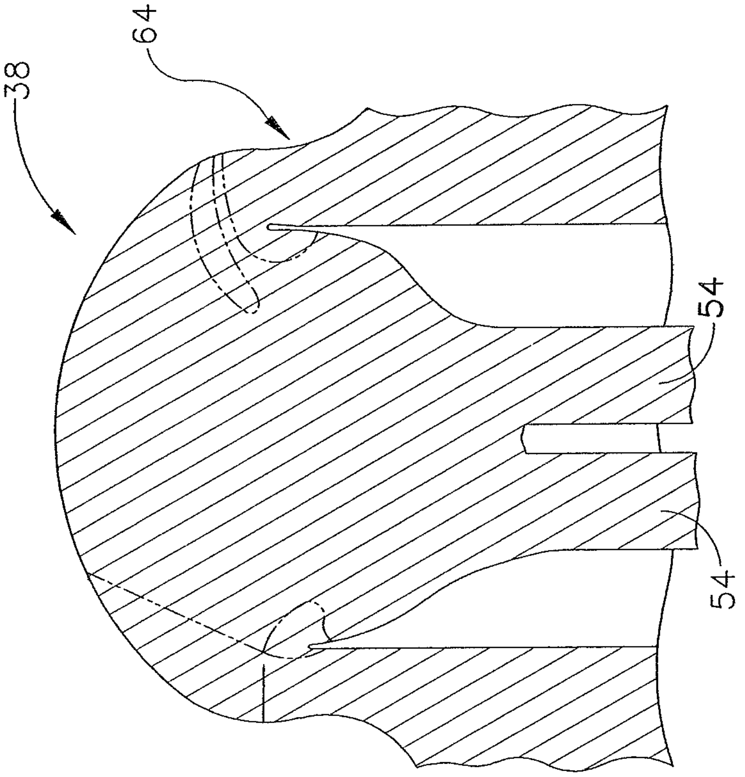
FIG. 6 is a section view of an exemplary weld following the process of laser cleaning.

Referring now to FIG. 6, a side section view of an exemplary terminal 38 is depicted and thus a detailed section view, two thermocouple wires 54 are shown extending through an exemplary terminal wall area 62. Due to the preparation process previously described, the weld bond of the wires 54 is clean with appropriate bonding. The wires 54 do not depict any broken or cracked areas which would create bonding problems. Additionally, the clean thermocouple leads 54 allow for such appropriate weld to occur when the subsequent welding of these leads happens during the manufacture process.

According to one example, the following criteria are desirable and may be met by use of the laser cleaning process described herein. It is desirable that the weld fusion across the wire diameter exposed be greater than 80%. It is also desirable that the weld fusion across the terminal post walls be greater than 80%. It is further desirable that individual porosity diameter should not be greater than 0.015 inches. Finally, it is desirable as well that the total area of accumulated porosity shall not exceed 30% of the total weld area exposed. These goals are capable by cleaning the thermocouple leads or wires 54, 58 which the laser process described herein. Whereas in the alternative, prior art methods of cleaning the thermocouple leads or wires 54, 58 did not result in such favorable results in the welding process.

The laser 70 according to one exemplary embodiment is a Trumark 6020 laser with a wave length of 1,064 nm. The beam quality $M^2$ is 1.2 and has a pulse repetition rate of between 1,000 and 120,000 hz or cycles per second. The focus diameter of the laser is about 45 micrometers and has a scanner calibration accuracy of plus or minus 50 micrometers. The power setting of the laser according to one embodiment may be set to 100% to achieve the results described. However, this power setting may vary by varying the velocity of which the laser 70 moves.

Figure 7:
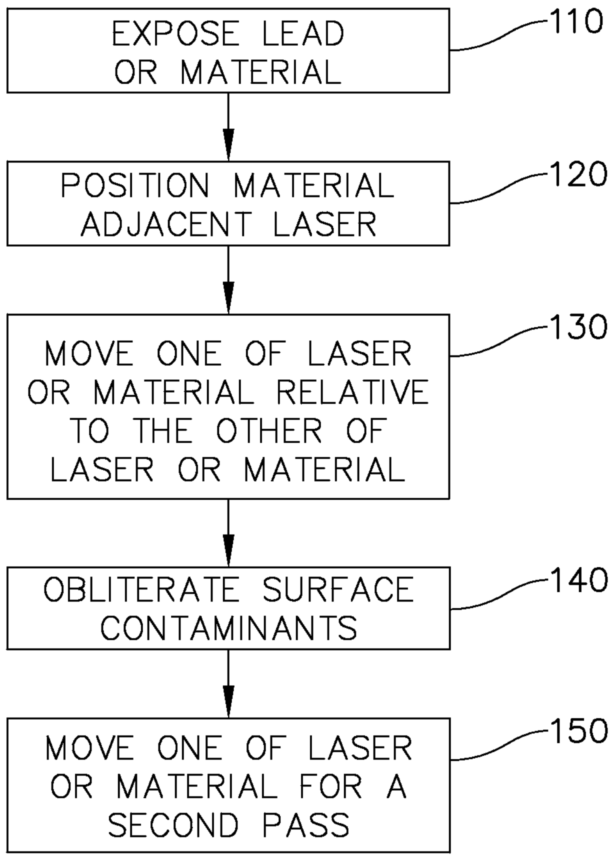
FIG. 7 is a flow chart setting for the exemplary steps of the method.

Referring now to FIG. 7, exemplary steps of the method are shown in a flowchart. For example, the lead or other material is exposed for cleaning at step 110. Next, the material is positioned adjacent the laser at step 120. This may also or alternatively require movement of the laser 70 to a preselected position. In a third exemplary step 130, one of the laser or the material is moved relative to the other of the laser or material so that the contaminants may be obliterated at step 140. If required, an additional step of moving one of the laser or material for a second pass may be utilized at step 150 for further cleaning. Various adjustments may be made to the laser 70 during these steps such as power, focus, beam width, and speed of movement all in accordance with the goal of obtaining a desirable removal of surface contaminants from the lead or material.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Furthermore, references to one embodiment are not intended to be interpreted as excluding the existence of additional embodiments that may also incorporate the recited feature.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

What I claim is:

1. A method of preparing a thermocouple having dissimilar leads material utilized in a gas turbine for welding, comprising:

positioning said thermocouple, which comprises a first wire and a second wire of dissimilar materials, each wire having an insulating sheath and a magnesium oxide surface contaminant beneath said sheath, said first wire and said second wire being joined at first ends within a probe, adjacent a laser at second ends of at least one of said first wire and said second wire extending from said probe, said first wire and said second wire being KN and KP wire, respectively, wherein said KN wire comprises a negatively polarized Nickel-aluminum-silicon type K thermoelement, and said KP wire comprises a positively polarized Nickel and Chromium type K thermoelement;

moving one of said first and second wires and said laser at a speed of at least about 30 inches per second;

obliterating said magnesium oxide surface contaminant from said material with said laser.

2. The method of claim 1 further comprising one of increasing or decreasing the speed of movement of one of said laser or said wires to vary the energy to said wires.

3. The method of claim 1 wherein said laser has a pulse frequency of between 100 and 150,000 cycles per second.

4. The method of claim 3 wherein said laser has said pulse frequency of between 30,000 and 60,000 cycles per second.

5. The method of claim 1 wherein said laser is movable relative to said wires.

6. The method of claim 1 wherein said wires are movable relative to said laser.

7. The method of claim 1 wherein said wires are thermocouple wires.

8. The method of claim 1 further comprising TIG welding said wires following said obliterating.

9. The method of claim 1 wherein said laser has a beam width of between 0.001" and 0.005".

10. The method of claim 1 further comprising rotating said wires 180 degrees and moving said laser relative to said wires a second time.

11. A method of preparing a thermocouple lead for welding, comprising:

exposing said lead extending from a thermocouple probe, said lead being formed of one of KN and KP wire, wherein said KN wire comprises a negatively polarized Nickel-aluminum-silicon type K thermoelement, and said KP wire comprises a positively polarized Nickel and Chromium type K thermoelement;

said lead having an insulating sheath and a surface contaminant of magnesium oxide;

positioning said lead adjacent a laser;

passing said laser over said lead at a speed of at least about 30 inches per second;

obliterating said surface contaminant from said lead with said laser.

12. The method of claim 11 further comprising passing the laser over said lead at least one more time to clean one or more sides of said lead.

13. The method of claim 11 rotating said laser to clean various sides of said lead.

14. A method of preparing a thermocouple wire for welding, comprising:

aiming a laser at a lead formed of one of two dissimilar materials, said two dissimilar materials being KN and KP wire, wherein said KN wire comprises a negatively polarized Nickel-aluminum-silicon type K thermoelement, and said KP wire comprises a positively polarized Nickel and Chromium type K thermoelement;

said lead connected to a thermocouple probe having said two dissimilar materials therein, said two dissimilar materials having a sheath insulation and a magnesium oxide surface contaminant layer;

passing one of said laser and said lead over the other of said laser and said lead at a speed of at least about 30 inches per second;

obliterating said surface contaminant from said lead during said passing.

15. The method of claim 14 rotating one of said laser and said lead to clean a second side of said lead.

16. The method of claim 14 further comprising varying a speed of said passing to increase or decrease energy of said laser on said lead.

* * * * *